(12) United States Patent
Lee et al.

(10) Patent No.: US 11,954,796 B2
(45) Date of Patent: Apr. 9, 2024

(54) SOIL DISTRIBUTION PLANNING SYSTEM CONSIDERING USEFUL SOIL AND SPOIL BANK INFORMATION

(71) Applicant: HD HYUNDAI INFRACORE CO., LTD., Incheon (KR)

(72) Inventors: Seungsoo Lee, Seoul (KR); Minsung Kang, Incheon (KR); Gijung Yun, Incheon (KR); Seungman Yang, Yongin-si (KR); Wooyong Jung, Seoul (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 114 days.

(21) Appl. No.: 17/637,567

(22) PCT Filed: Jun. 2, 2020

(86) PCT No.: PCT/KR2020/007122
§ 371 (c)(1),
(2) Date: Feb. 23, 2022

(87) PCT Pub. No.: WO2020/262834
PCT Pub. Date: Dec. 30, 2020

(65) Prior Publication Data
US 2022/0406011 A1 Dec. 22, 2022

(30) Foreign Application Priority Data

Jun. 28, 2019 (KR) .................. 10-2019-0078144

(51) Int. Cl.
*G06T 17/05* (2011.01)
*E02D 17/00* (2006.01)

(52) U.S. Cl.
CPC .............. *G06T 17/05* (2013.01); *E02D 17/00* (2013.01)

(58) Field of Classification Search
CPC .................................. G06T 17/05; E02D 17/00
See application file for complete search history.

(56) References Cited

U.S. PATENT DOCUMENTS

| 2005/0192752 A1* | 9/2005 | Rooney | G01V 11/00 702/5 |
| 2010/0245542 A1* | 9/2010 | Kim | G01B 11/00 37/444 |

(Continued)

FOREIGN PATENT DOCUMENTS

| JP | 2003-261928 A | 9/2003 | |
| KR | 20100116382 A * | 4/2009 | G06F 30/13 |

(Continued)

OTHER PUBLICATIONS

International Search Report dated Sep. 10, 2020 for corresponding International Patent Application No. PCT/KR2020/007122.

(Continued)

*Primary Examiner* — Terrell M Robinson
(74) *Attorney, Agent, or Firm* — Hauptman Ham, LLP

(57) ABSTRACT

The disclosure relates to a soil distribution planning system. The soil distribution planning system according to an embodiment includes a grid-model generation module configured to receive information about three-dimensional (3D) topography, ground and a target model and generate a 3D grid model by dividing a target area; an earthwork-volume calculation module configured to calculate an earthwork volume of each grid model generated by the grid-model generation module and store the calculated earthwork volume in a database; and an earthwork-volume distribution module configured to distribute the earthwork volume of a cutting area to a banking area based on the earthwork volume stored in the database.

18 Claims, 11 Drawing Sheets

(56) References Cited

U.S. PATENT DOCUMENTS

2013/0090898 A1* 4/2013 Detwiler .............. G06Q 50/165
703/1
2016/0321763 A1* 11/2016 Shike ..................... G06Q 50/08
2020/0232179 A1* 7/2020 Sasaki ................... E02F 9/2041

FOREIGN PATENT DOCUMENTS

| KR | 10-2010-0116382 A | 11/2010 | |
|---|---|---|---|
| KR | 20150015725 A * | 8/2013 | ....... G06Q 10/06316 |
| KR | 10-2015-0015725 A | 2/2015 | |
| KR | 10-1546708 B1 | 8/2015 | |
| KR | 10-1669029 B1 | 11/2016 | |

OTHER PUBLICATIONS

Written Opinion dated Sep. 10, 2020 for corresponding International Patent Application No. PCT/KR2020/007122.

* cited by examiner

SOIL DISTRIBUTION PLANNING SYSTEM CONSIDERING USEFUL SOIL AND SPOIL BANK INFORMATION

CROSS-REFERENCE TO RELATED APPLICATION

The present application is a national stage filing under 35 U.S.C § 371 of PCT application number PCT/KR2020/007122 filed on Jun. 2, 2020 which is based upon and claims the benefit of priorities to Korean Patent Application No. 10-2019-0078144, filed on Jun. 28, 2019, in the Korean Intellectual Property Office. The disclosures of the above-listed applications are hereby incorporated by reference herein in their entireties.

TECHNICAL FIELD

The disclosure relates to a soil distribution planning system, in which a three-dimensional (3D) topographical model, a ground model, and an earthwork target map are used to divide a global area into 3D grid models, and an earthwork volume is analyzed considering properties of useful soil and spoil in each grid model, thereby making an optimal soil-distribution plan based on dozer transport and dump-truck transport.

BACKGROUND ART

Earthworks refer to works for shaping the ground as desired through processes such as excavation, digging, transport, and the like. A soil distribution plan refers to a plan for effectively using onsite soils to perform the earthworks efficiently.

FIG. 1 illustrates an example that an earthwork volume is manually drawn up based on a two-dimensional (2D) contour map. First, the 2D contour map is divided by a certain grid. Next, the earthwork volume in each grid is manually drawn up based on topography and an average elevation value of rock lines. Then, a soil distribution plan is established based on an expert's experience.

When the soil distribution plan is made in this way by manually drawing up the earthwork volume through the 2D contour map, there are disadvantages in that a large error occurs due to rough quantity calculation based on an area and an elevation difference, and a plan for works is highly likely to be inefficiently established due to many trials and errors in the case of a person who lacks expertise and experience.

Further, when the contour map is not a 3D map and thus a 2D horizontal plan is given, there are also disadvantages in that it is difficult to determine a start point of the works, and it is impossible to take a 3D vertical plan into account to distribute soil in multi-stage excavation works.

In the related art, a global model is divided by a grid of 40 m×40 m, and a total earthwork volume is calculated based on an average topographical elevation and a planned elevation in each grid. However, when topography or a shape on a target drawing is complicated, a very large error occurs in the related art because the earthwork volume is converted from the area.

In addition, when a stratal structure is complicated, there is a disadvantage in that it takes too much time to calculate a useful soil and a spoil bank.

The aforementioned background art is technical information owned by the inventor to derive the disclosure or acquired by the inventor while deriving the disclosure, and is not regarded as the prior art necessarily disclosed to a general public prior to the filing date of the disclosure.

DISCLOSURE

Technical Problem

The disclosure is conceived to solve the foregoing problems, and an aspect of the disclosure is to automatically calculate an earthwork volume of each stratum in each grid by integrating three-dimensional (3D) topography, the ground and a target drawing.

Further, an aspect of the disclosure is to establish a soil distribution plan with work sections separated based on characteristics of main earthwork transport equipment of a dozer and a dump truck.

In addition, an aspect of the disclosure is to establish an internal earthwork distribution plan optimized for the amount of useful soil, and predict a site condition of after finally distributing the useful soil while considering the height value of each grid model.

Technical Solution

To solve the foregoing problems, embodiments of the disclosure have characteristics as follows.

According to an embodiment, a soil distribution planning system includes: a grid-model generation module configured to receive information about three-dimensional (3D) topography, ground and a target model and generate a 3D grid model by dividing a target area; an earthwork-volume calculation module configured to calculate an earthwork volume of each grid in the 3D grid model generated by the grid-model generation module and store the calculated earthwork volume in a database; and an earthwork-volume distribution module configured to distribute an earthwork volume of a cutting area to a banking area based on the earthwork volume stored in the database.

The grid-model generation module may include a cutting/banking area designation engine configured to designate the cutting area and the banking area by comparing a geometry of the received 3D topography and the received target model, and a boundary-line extraction engine configured to extract boundary lines of the cutting area and the banking area.

The grid-model generation module may include a grid-size setting engine configured to set a grid size of the 3D grid model, wherein a height of a grid in the grid size is set based on a designed elevation that one-stage excavation has in consideration of multi-stage excavation of earthworks.

The earthwork-volume calculation module configured to store a total earthwork volume, earthwork volumes according to rock qualities, a useful soil volume, and a spoil bank volume in the database.

When a dozer is used in a soil distribution plan, the earthwork-volume distribution module may include a dozer work engine configured to: generate offset lines at a certain distance from the boundary line to the cutting area and the banking area; select grids including the offset lines by separating all grid models included between the offset lines and the grid models including the offset lines; and calculate a cutting useful-soil volume for grids included in the cutting area, and a banking volume for each grid included in the banking area.

The earthwork-volume distribution module may include a grid selection engine configured to select a grid, which has the highest elevation in a cutting area, as a supplying cell for distributing the earthwork volume from the cutting area to the banking area.

The earthwork-volume distribution module may include a useful-soil distribution engine configured to distribute a useful soil volume of the supplying cell to the receiving cell of the banking area.

The useful-soil distribution engine may be configured to select a receiving cell corresponding to a predetermined condition from the supplying cell and distribute the useful soil volume to the supplying cell.

The useful-soil distribution engine may be configured to: calculate an excess of the supplied useful soil volume when the useful soil volume supplied from the supplying cell exceeds the useful soil volume needed for the receiving cell; and select a next receiving cell corresponding to the predetermined condition from the supplying cell and distribute the excess to the selected receiving cell.

The useful-soil distribution engine may be configured to select a next supplying cell and distribute the useful soil volume of the selected next supplying cell to the receiving cell when the useful soil volume supplied from the supplying cell falls short of the useful soil volume needed for the receiving cell.

The useful-soil distribution engine may be configured to take a spoil bank out of the cutting area when there is no other receiving cell.

According to an embodiment, a soil distribution planning method includes: receiving information about three-dimensional (3D) topography, ground and a target model; a grid-model generation step of generating a 3D grid model by dividing a target area; an earthwork-volume calculation step of calculating an earthwork volume of each grid in the 3D grid model and storing the calculated earthwork volume in a database; and an earthwork-volume distribution step of distributing an earthwork volume of a cutting area to a banking area based on the earthwork volume stored in the database.

The grid-model generation step may include: a cutting/banking area designation step of designating the cutting area and the banking area by comparing a geometry of the received 3D topography and the received target model; a boundary-line extraction step of extracting boundary lines of the cutting area and the banking area; and a grid-size setting step of setting a grid size of the 3D grid model.

In the grid-size setting step, a height of a grid may be set based on a designed elevation that one-stage excavation has in consideration of multi-stage excavation of earthworks. The earthwork-volume calculation step may include storing a total earthwork volume, earthwork volumes according to rock qualities, a useful soil volume, and a spoil bank volume in the database.

The earthwork-volume distribution step may include an earthwork-volume distribution step for a dozer, when a dozer is used in a soil distribution plan, including: generating offset lines at a certain distance from the boundary line to the cutting area and to the banking area; selecting grids including the offset lines by separating all grid models included between the offset lines and the grid models including the offset lines; and calculating a cutting useful-soil volume for grids included in the cutting area, and a banking volume for each grid included in the banking area.

The earthwork-volume distribution step may include a grid selection step of selecting a grid, which has the highest elevation in a cutting area, as a supplying cell for distributing the earthwork volume from the cutting area to the banking area.

The earthwork-volume distribution step may include a useful-soil distribution step of distributing a useful soil volume of the supplying cell to the receiving cell of the banking area, the useful-soil distribution step may include selecting a receiving cell corresponding to a predetermined condition from the supplying cell and distributing the useful soil volume to the supplying cell.

The useful-soil distribution step may include: calculating an excess of the supplied useful soil volume when the useful soil volume supplied from the supplying cell exceeds the useful soil volume needed for the receiving cell; and selecting a next receiving cell corresponding to the predetermined condition from the supplying cell and distributing the excess to the selected receiving cell.

The useful-soil distribution step may include selecting a next supplying cell and distributing the useful soil volume of the selected next supplying cell to the receiving cell when the useful soil volume supplied from the supplying cell falls short of the useful soil volume needed for the receiving cell.

The predetermined condition may include the shortest distance from the supplying cell to the receiving cell.

Advantageous Effect

The disclosure has effects on establishing optimal distribution plans by generating information about useful soil, spoil bank, cutting and banking based on three-dimensional (3D) grid models, and dividing a plan of efficiently distributing the useful soil based on two means of dozer transport and dump-truck transport.

MODE FOR INVENTION

The merits and features of the disclosure and methods of achieving the same will become apparent from embodiments set forth herein in conjunction with the accompanying drawings. The disclosure may, however, be embodied in many different forms and should not be construed as being limited to the following embodiments, rather, these embodiments are provided so that the disclosure will be thorough and complete and will fully convey the scope of the disclosure to those skilled in the art.

Below, embodiments of the disclosure will be described in detail with reference to the accompanying drawings.

Figure 1:
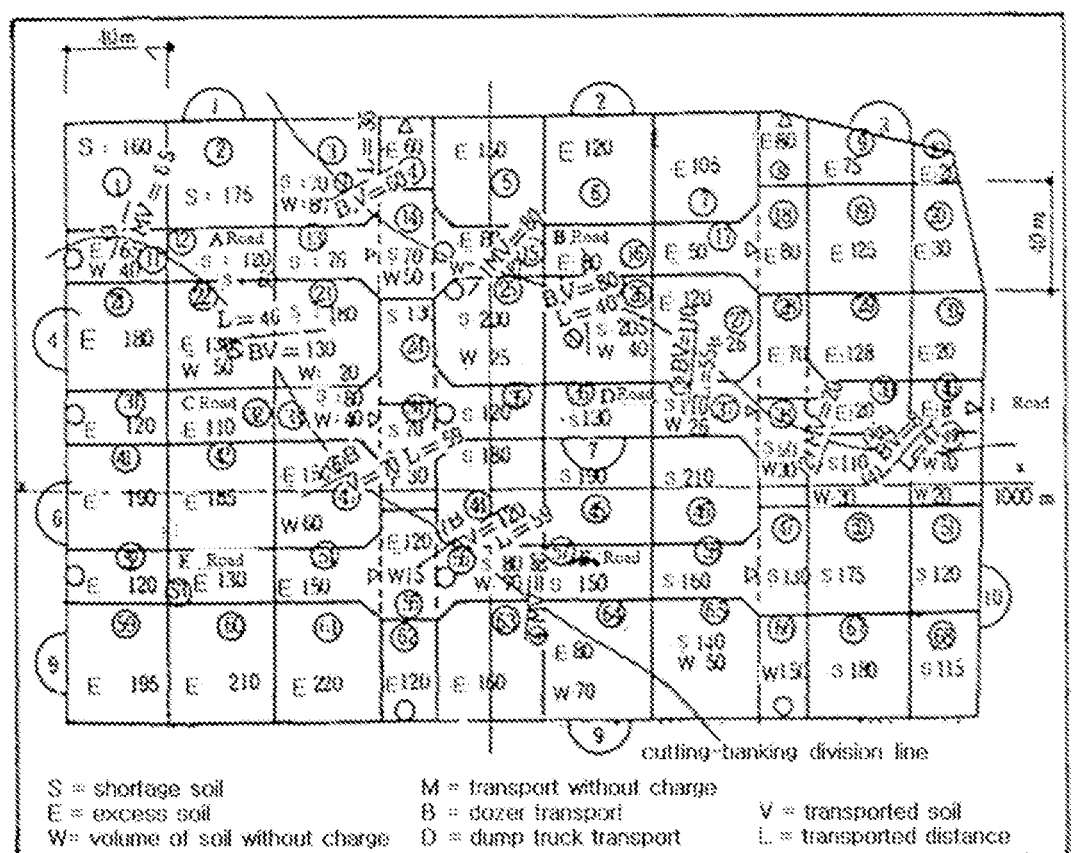
FIG. 1 illustrates an example that an earthwork volume is manually drawn up based on a two-dimensional (2D) contour map.
Figure 2:
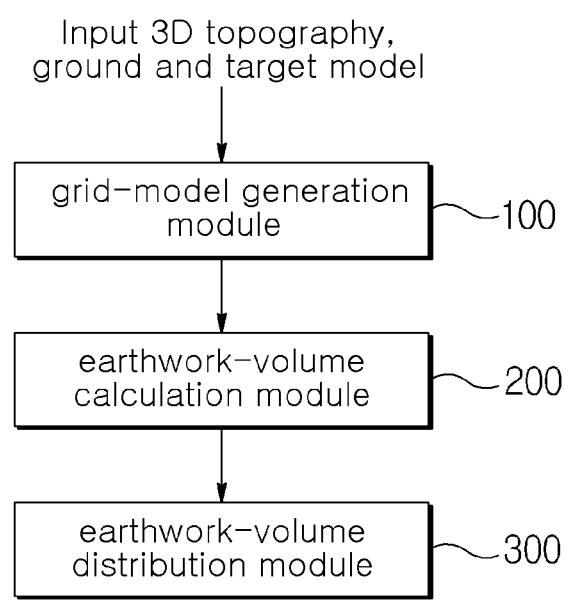
FIG. 2 is a block diagram of a soil distribution planning system according to an embodiment of the disclosure.

FIG. 2 is a block diagram of a soil distribution planning system according to an embodiment of the disclosure.

Referring to FIG. 2, the soil distribution planning system according to the disclosure includes a grid-model generation module 100, an earthwork-volume calculation module 200, and an earthwork-volume distribution module 300.

The physical configuration of the soil distribution planning system according to the disclosure may be configured with software (program) or hardware in a general personal computer (PC), a web server, or the like computer system.

The grid-model generation module 100 receives information about three-dimensional (3D) topography, the ground and a target model and generates a 3D grid model by dividing a target area.

The earthwork-volume calculation module 200 calculates an earthwork volume of each grid model generated by the grid-model generation module 100 and stores the calculated earthwork volume in a database.

The earthwork-volume distribution module 300 distributes the earthwork volume from a cutting area to a banking area based on the earthwork volume stored in the database.

Figure 3:
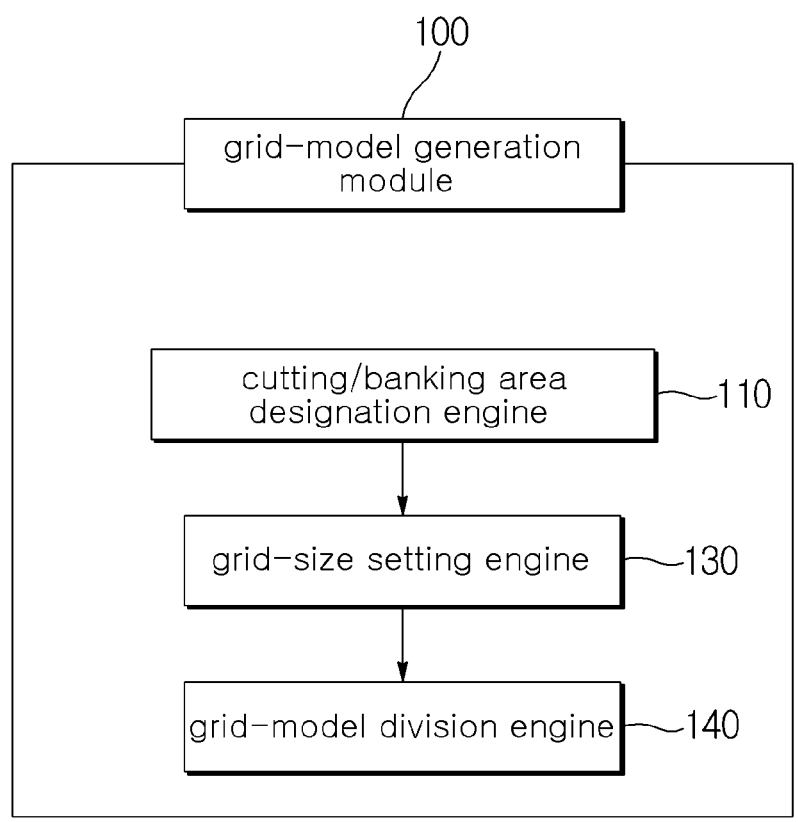
FIG. 3 is a block diagram of a grid-model generation module according to an embodiment of the disclosure.

FIG. 3 is a block diagram of a grid-model generation module according to an embodiment of the disclosure.

The grid-model generation module 100 includes a cutting/banking area designation engine 110, a boundary-line extraction engine 120, a grid-size setting engine 130, and a grid-model division engine 140.

The cutting/banking area designation engine 110 designates a cutting (excavation) area and a banking(filling) area by comparing the geometry of the received 3D topography and the received target model.

The boundary-line extraction engine 120 extracts the boundary lines of the cutting area and the banking area designated by the cutting/banking area designation engine 110.

The grid-size setting engine 130 sets a grid size of the 3D grid model. In the grid size, the height of a grid may be set based on a designed elevation that one-stage excavation has in consideration of multi-stage excavation of earthworks.

The grid-model division engine 140 performs horizontal division in consideration of an input depth from the highest elevation within the boundary lines extracted by the boundary-line extraction engine 120, and performs plane division when a user selects a start point for the division and clicks a direction.

Figure 4:
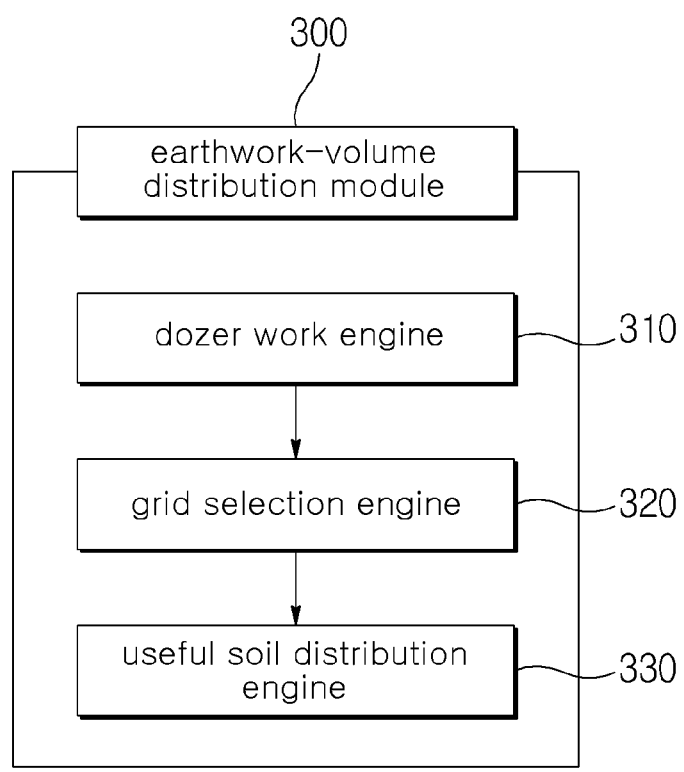
FIG. 4 is a block diagram of a grid earthwork-volume distribution module according to an embodiment of the disclosure.

FIG. 4 is a block diagram of a grid earthwork-volume distribution module according to an embodiment of the disclosure.

The earthwork-volume distribution module 300 includes a dozer work engine 310, a grid selection engine 320, and a useful-soil distribution engine 330.

The dozer work engine 310 generates offset lines inside and outside leaving a space at a certain distance, preferably, at a distance of 30 m from a reference line, i.e., the cutting boundary line, when a dozer is used in a soil distribution plan. As main equipment for the soil distribution plan, a dozer and a dump truck are generally used. The dozer may be designed for a transport distance of about 60 m, and the dump truck may be designed for a transport distance longer than that for the dozer. For the transport distance shorter than or equal to 60 m, it is more economical to use the dozer than to use the dump truck. Therefore, the certain distance may be 30 m.

Further, the dozer work engine 310 selects an internal grid including the offset lines by separating all grid models included between the offset lines and the grid models including the offset lines. Further, the dozer work engine 310 calculates a cutting useful-soil volume for grids included in the cutting area, and a banking volume for each grid included in the banking area.

The grid selection engine 320 selects the grid model having the highest elevation in the cutting area as a supplying cell for distributing the earthwork volume from the cutting area to the banking area. Further, when there are a plurality of grid models having the highest elevation in the cutting area, the grid selection engine 320 may select a cell, which is located farthest from an onsite entrance, in the cutting area as the supplying cell.

The useful-soil distribution engine 330 distributes the useful soil volume from the supplying cell to a receiving cell of the banking area. Specifically, the receiving cell corresponding to a predetermined condition from the supplying cell is selected, and the useful soil volume of the supplying cell is distributed to the selected receiving cell. The receiving cell corresponding to the predetermined condition may be a receiving cell located at the shortest distance from the supplying cell. A method of selecting the receiving cell located at the shortest distance may use a Dijkstra algorithm in selecting the receiving cell located at the shortest distance. The plan is established with the grid model located at the shortest distance by calculating distances from the supplying cell to all nearby nodes. When information about nodes where movement is not allowed is previously input for each grid, a route plan considering this node information is reflected in the soil distribution plan.

When the useful soil volume supplied from the supplying cell exceeds the useful soil volume needed for the receiving cell, the excess of the supplied useful soil volume is calculated. Then, the next receiving cell corresponding to the predetermined condition from the supplying cell is selected and the excess is distributed to the selected receiving cell. The receiving cell corresponding to the predetermined condition may be a receiving cell located at the shortest distance from the supplying cell.

On the other hand, when the useful soil volume supplied from the supplying cell falls short of the useful soil volume needed for the receiving cell, the next supplying cell is selected and the useful soil volume of the selected supplying cell is distributed to the receiving cell. In this case, the distribution of the useful soil volume to this receiving cell may be temporarily suspended as necessary, and another receiving cell may be preferentially filled. For example, when the distance between the receiving cell and the next supplying cell is much longer than the distance between the next supplying cell and the other receiving cell, it may be more efficient to temporarily suspend the distribution of the useful soil volume to the receiving cell and preferentially fill the other receiving cell.

Last, the useful-soil distribution engine 330 takes a spoil bank out of the cutting area when there are no more receiving cells to receive the useful soil volume.

Figure 5:
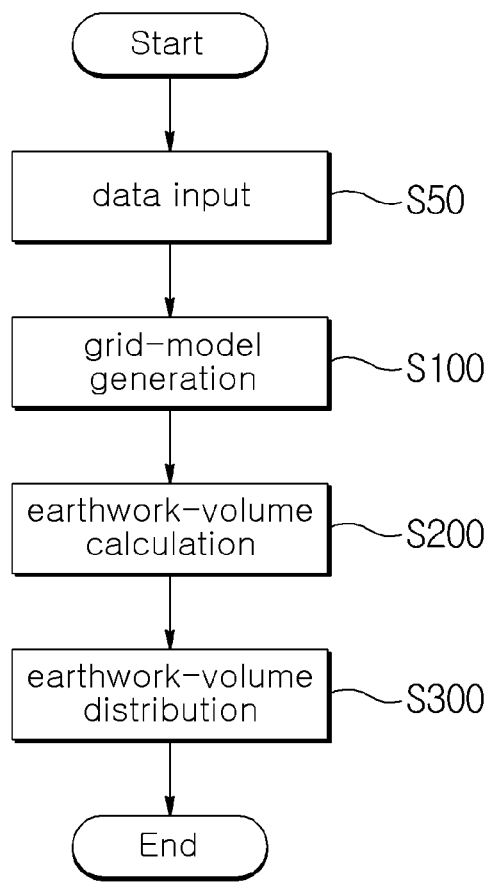
FIG. 5 is a flowchart showing a method of establishing a soil distribution plan according to an embodiment of the disclosure.

FIG. 5 is a flowchart showing a method of establishing a soil distribution plan according to an embodiment of the disclosure.

Referring to FIG. 5, the method of establishing the soil distribution plan according to the disclosure includes a step S50 of receiving information about 3D topography, the ground and a target model; a grid-model generation step S100 of generating a 3D grid model by dividing a target area; an earthwork-volume calculation step S200 of calculating an earthwork volume for each grid model and storing the calculated earthwork volume in a database; and an earthwork-volume distribution step S300 of distributing an earthwork volume from a cutting area to a banking area based on the earthwork volume stored in the database.

Figure 6:
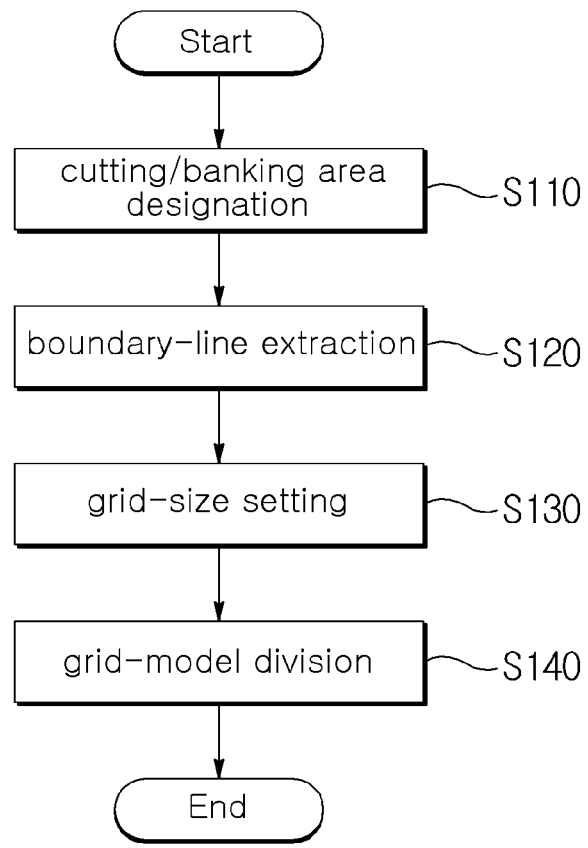
FIG. 6 is a flowchart showing a grid-model generation step according to an embodiment of the disclosure.

FIG. 6 is a flowchart showing the grid-model generation step according to an embodiment of the disclosure.

The grid-model generation step S100 includes a cutting/banking area designation step S110 of designating cutting and banking areas by comparing the geometry of the received 3D topography and the received target model; a boundary-line extraction step S120 of extracting the boundary lines of the cutting area and the banking area; a grid-size setting step S130 of setting a grid size of the 3D grid model; and a grid-model division step S140 of performing horizontal division in consideration of an input depth from the highest elevation within the boundary lines extracted in the boundary-line extraction step and performing plane division when a user selects a start point for the division and clicks a direction.

Figure 7:
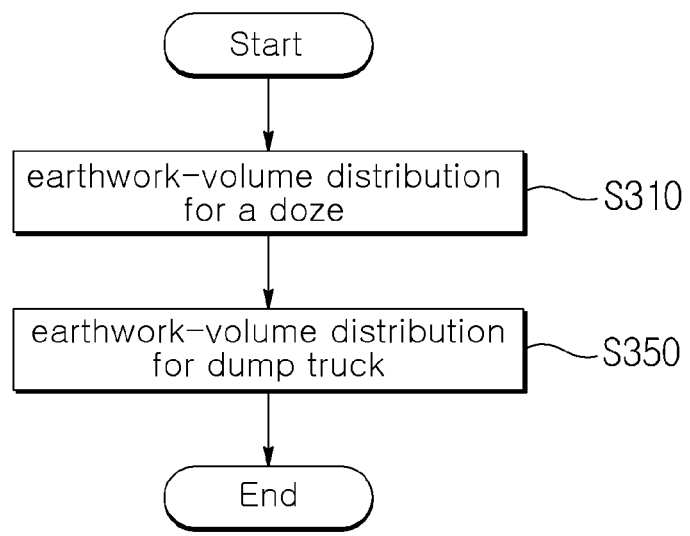
FIG. 7 is a flowchart showing an earthwork-volume distribution step according to an embodiment of the disclosure.

FIG. 7 is a flowchart showing the earthwork-volume distribution step according to an embodiment of the disclosure.

The earthwork-volume distribution step S300 includes an earthwork-volume distribution step S310 for a dozer, and an earthwork-volume distribution step S350 for a dump truck.

In general, a dozer and a dump truck are used as main equipment for the soil distribution plan, in which the dozer is used in the distribution for a transport distance of about 60 m and the dump truck is used in the distribution for the transport distance longer than or equal to 60 m because the dozer has higher efficiency than the dump truck within the transport distance of about 60 m.

Figure 8:
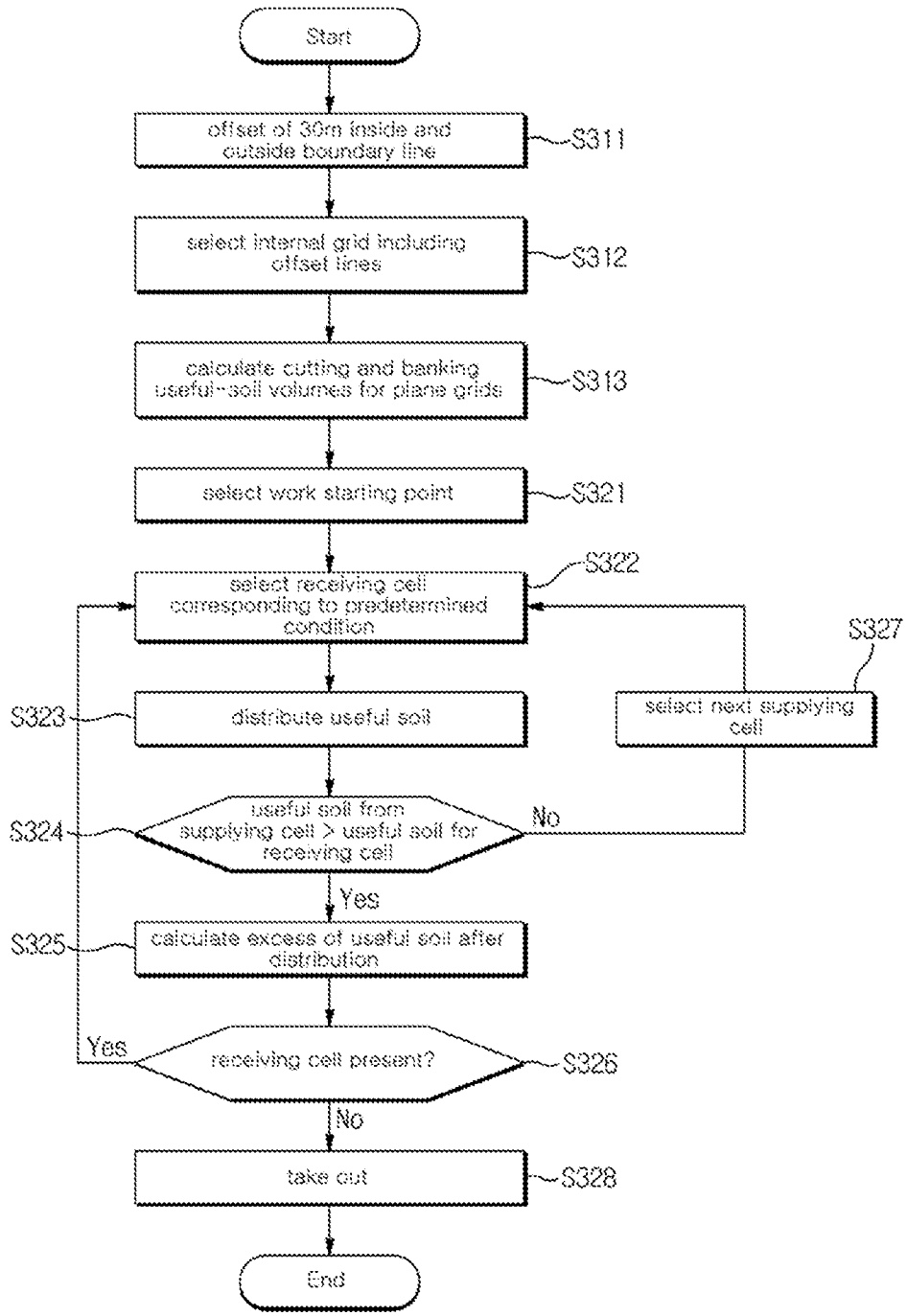
FIG. 8 is a flowchart showing an earthwork-volume distribution step for a dozer according to an embodiment of the disclosure.

FIG. 8 is a flowchart showing the earthwork-volume distribution step for a dozer according to an embodiment of the disclosure.

When the dozer is used in the soil distribution plan, the earthwork-volume distribution step S310 for the dozer first includes generating offset lines inside and outside at a certain distance from a reference line, i.e., the cutting boundary line (S311). Because the dozer is excellent in efficiency compared to the dump truck within the transport distance of about 60 m, the offset lines may be generated inside and outside leaving a space of 30 m, i.e., half of 60 m.

Next, an internal grid including the offset lines is selected by separating all grid models included between the offset lines and the grid models including the offset lines (S312).

Then, a cutting useful-soil volume for grids included in the cutting area is calculated, and a banking volume for each grid included in the banking area is calculated (S313).

After the cutting useful-soil volume and the banking volume are calculated, a work starting point for the cutting area is selected (S321). As the work starting point for the cutting area, a grid model having the highest elevation in the cutting area is selected. When there is a plurality of grid models having the highest elevation in the cutting area, a cell, which is located farthest from an onsite entrance, in the cutting area may be selected as the supplying cell.

When the selection of the work starting point is completed, the receiving cell is selected based on a predetermined condition (S322). The predetermined condition may for example include the shortest distance from the supplying cell, a transport path, topography, an obstacle, and the like options designated by a user for selecting the receiving cell.

Next, the useful soil volume of the supplying cell is distributed to the selected receiving cell (S323).

By comparing the useful soil volume supplied from the supplying cell and the useful soil volume needed for the receiving cell, it is identified whether the useful soil volume supplied from the supplying cell is more or less than the useful soil volume needed for the receiving cell (S324).

When the useful soil volume supplied from the supplying cell exceeds the useful soil volume needed for the receiving cell, the excess of the supplied useful soil volume is calculated (S325). In addition, it is identified whether there is a receiving cell capable of receiving the excess of the useful soil after the distribution of the supplying cell (S326). When the receiving cell is present, the next receiving cell corresponding to the predetermined condition from the supplying cell is selected (S322) and the excess of the useful soil volume is distributed to the selected receiving cell (S323). When the receiving cell is not present anymore, the spoil bank is taken out of the cutting area (S328). The receiving cell corresponding to the predetermined condition from the supplying cell may be a receiving cell located at the shortest distance from the supplying cell.

Figure 9:
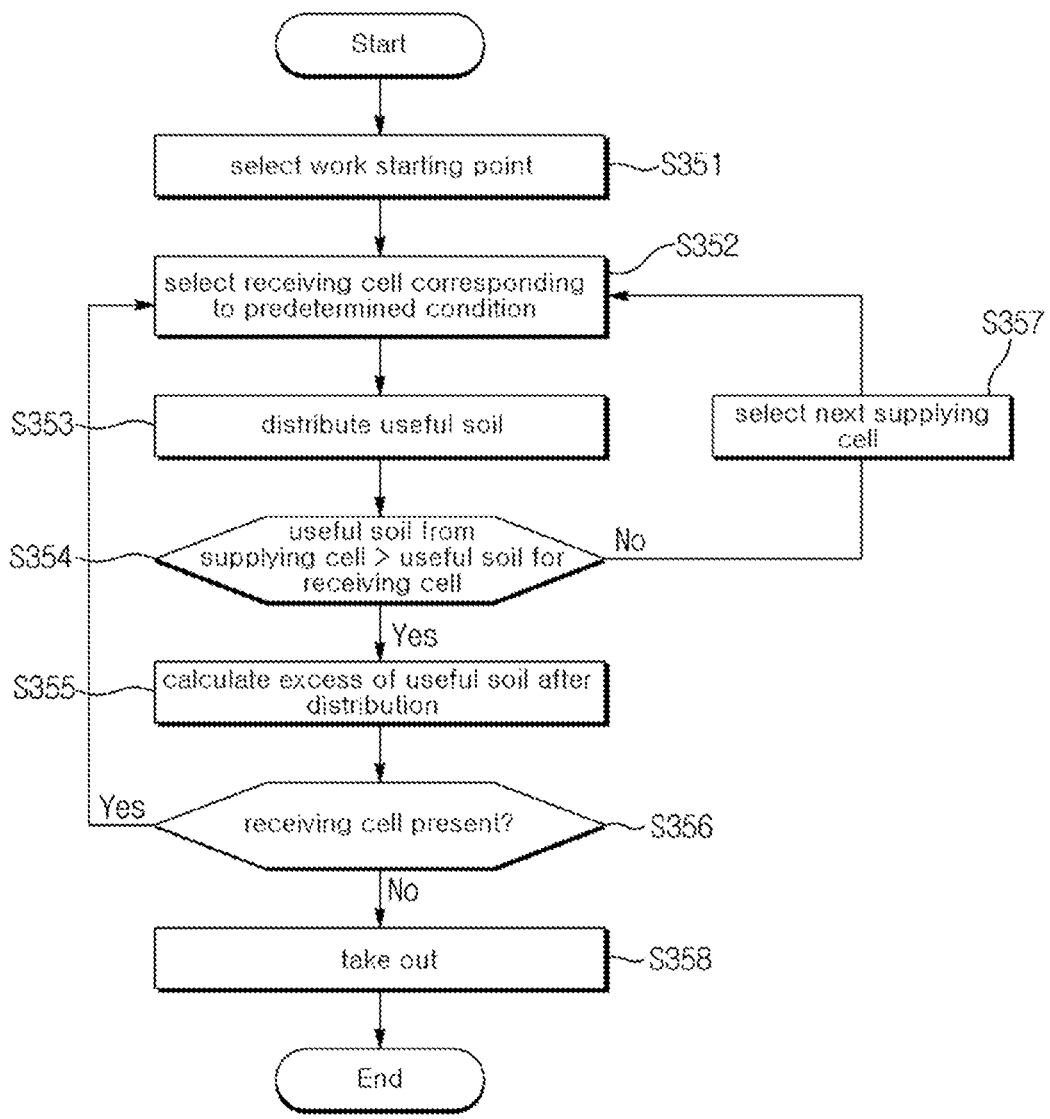
FIG. 9 is a flowchart showing an earthwork-volume distribution step for a dump truck according to an embodiment of the disclosure.

When the useful soil volume supplied from the supplying cell falls short of the useful soil volume needed for the receiving cell (S327), the next supplying cell is selected and the useful soil volume of the selected supplying cell is distributed to the receiving cell (S323). FIG. 9 is a flowchart showing the earthwork-volume distribution step for a dump truck according to an embodiment of the disclosure.

When the dozer is not used in the soil distribution plan or when the distribution is completed in the area for the dozer works, an earthwork-volume distribution plate for the dump truck is established.

The earthwork-volume distribution step S350 for the dump truck excludes step S311 of generating the offset lines, step S312 of selecting the internal grid including the offset lines, and step S313 of calculating the cutting useful-soil volume and calculating the banking volume for each grid included in the banking area from the earthwork-volume distribution step for the dozer.

The earthwork-volume distribution step S350 for the dump truck first selects a work starting point for the cutting area (S351). Like the earthwork-volume distribution step for the dozer, a grid model having the highest elevation in the cutting area is selected as the work starting point for the cutting area. When there is a plurality of grid models having the highest elevation in the cutting area, a cell, which is located farthest from an onsite entrance, in the cutting area may be selected as the supplying cell.

When the selection of the work starting point is completed, the next receiving cell is selected corresponding to a predetermined condition from the supplying cell (S352). The receiving cell corresponding to the predetermined condition from the supplying cell may be a receiving cell located at the shortest distance from the supplying cell.

Next, the useful soil volume of the supplying cell is distributed to the selected receiving cell (S353).

By comparing the useful soil volume supplied from the supplying cell and the useful soil volume needed for the receiving cell, it is identified whether the useful soil volume supplied from the supplying cell is more or less than the useful soil volume needed for the receiving cell (S354).

When the useful soil volume supplied from the supplying cell exceeds the useful soil volume needed for the receiving cell, the excess of the supplied useful soil volume is calculated (S355). In addition, it is identified whether there is a receiving cell capable of receiving the excess of the useful soil after the distribution from the supplying cell (S356). When the receiving cell is present, the receiving cell located at the next shortest distance from the supplying cell is selected (S352) and the excess of the useful soil volume is distributed (S353). When the receiving cell is not present any more, the spoil bank is taken out of the cutting area (S358).

Figure 10:
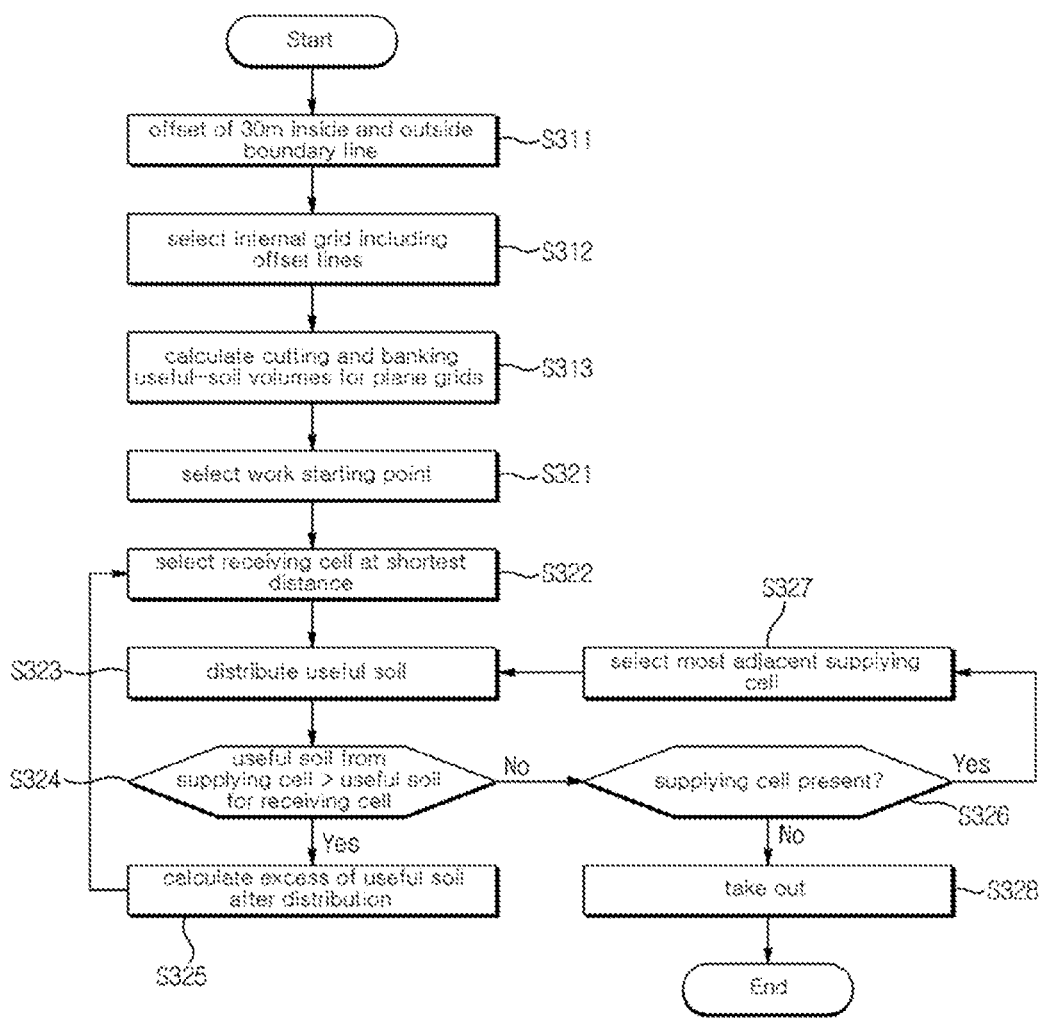
FIG. 10 is a flowchart showing an earthwork-volume distribution step for a dozer according to an alternative embodiment to FIG. 8.

When the useful soil volume supplied from the supplying cell falls short of the useful soil volume needed for the receiving cell, the next supplying cell is selected (S357) and the useful soil volume of the selected supplying cell is distributed to the receiving cell (S353). FIG. 10 is a flowchart showing the earthwork-volume distribution step for a dozer according to an alternative embodiment to FIG. 8.

Referring to FIG. 10, this embodiment is as follows.

When the dozer is used in the soil distribution plan, the earthwork-volume distribution step S310 for the dozer first includes generating offset lines inside and outside at a certain distance from a reference line, i.e., the cutting boundary line (S311). Because the dozer is excellent in efficiency as compared to the dump truck within the transport distance of about 60 m, the offset lines may be generated inside and outside leaving a space of 30 m, i.e., half of 60 m.

Next, an internal grid including the offset lines is selected by separating all grid models included between the offset lines and the grid models including the offset lines (S312).

Then, a cutting useful-soil volume for grids included in the cutting area is calculated, and a banking volume for each grid included in the banking area is calculated (S313).

After the cutting useful-soil volume and the banking volume are calculated, a work starting point for the cutting area is selected (S321). As the work starting point for the cutting area, a grid model having the highest elevation in the cutting area is selected. When there are a plurality of grid models having the highest elevation in the cutting area, a cell, which is located farthest from an onsite entrance, in the cutting area may be selected as the supplying cell.

When the selection of the work starting point is completed, the receiving cell is selected based on a predetermined condition (S322). The predetermined condition may for example include the shortest distance from the supplying cell, a transport path, topography, an obstacle, and the like options designated by a user for selecting the receiving cell.

Next, the useful soil volume of the supplying cell is distributed to the selected receiving cell (S323).

By comparing the useful soil volume supplied from the supplying cell and the useful soil volume needed for the receiving cell, it is identified whether the useful soil volume supplied from the supplying cell is more or less than the useful soil volume needed for the receiving cell (S324).

When the useful soil volume supplied from the supplying cell exceeds the useful soil volume needed for the receiving cell, the excess of the supplied useful soil volume is calculated (S325). In addition, a receiving cell located at the next shortest distance from the supplying cell is selected (S322), and the excess is distributed (S323).

When the useful soil volume supplied from the supplying cell falls short of the useful soil volume needed for the receiving cell, it is identified whether there is any other cell for supplying the useful soil volume to the receiving cell (S326).

When there is any other cell for supplying the useful soil volume, the next supplying cell located at the shortest distance from the receiving cell is selected (S327) and the useful soil volume of the selected supplying cell is distributed to the receiving cell (S323).

When there is no other cell for supplying the useful soil volume, the spoil bank is taken out of the cutting area (S328).

Figure 11:
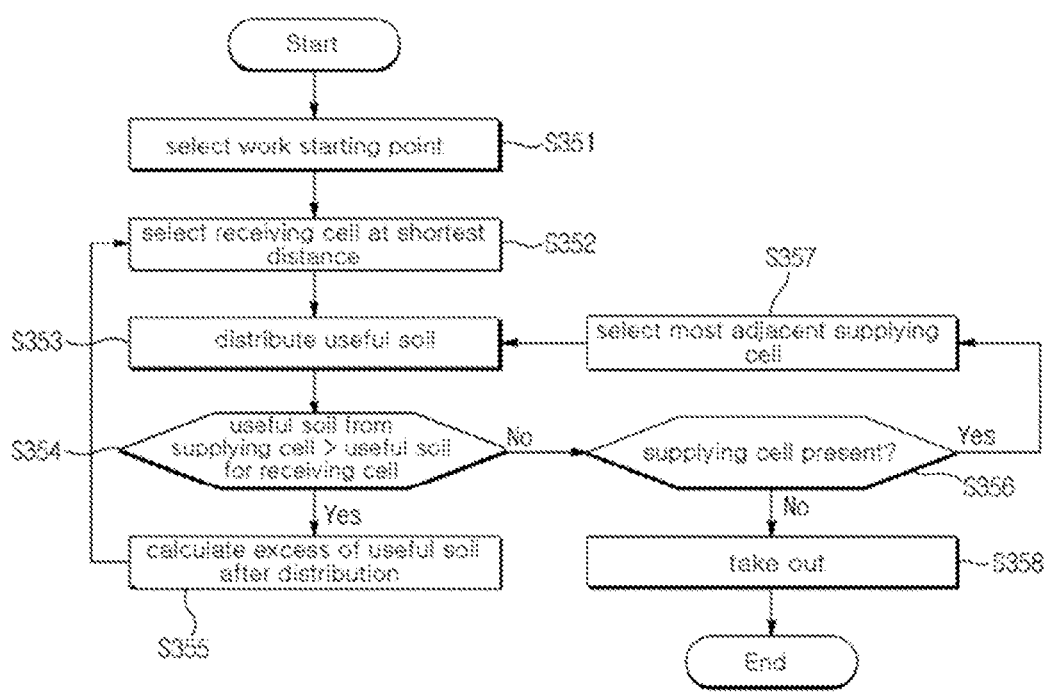
FIG. 11 is a flowchart showing an earthwork-volume distribution step for a dump truck according to an alternative embodiment of FIG. 9.

FIG. 11 is a flowchart showing the earthwork-volume distribution step for a dump truck according to an alternative embodiment of FIG. 9.

Referring to FIG. 11, this embodiment is as follows.

When the dozer is not used in the soil distribution plan or when the distribution is completed in the area for the dozer works, an earthwork-volume distribution plate for the dump truck is established.

The earthwork-volume distribution step S350 for the dump truck excludes step S311 of generating the offset lines, step S312 of selecting the internal grid including the offset lines, and step S313 of calculating the cutting useful-soil volume and calculating the banking volume for each grid included in the banking area from the earthwork-volume distribution step for the dozer.

The earthwork-volume distribution step S350 for the dump truck first selects a work starting point for the cutting area (S351). Like the earthwork-volume distribution step for the dozer, a grid model having the highest elevation in the cutting area is selected as the work starting point for the cutting area. When there is a plurality of grid models having the highest elevation in the cutting area, a cell, which is located farthest from an onsite entrance, in the cutting area may be selected as the supplying cell.

When the selection of the work starting point is completed, the receiving cell located at the shortest distance from the supplying cell is selected (S352).

Next, the useful soil volume of the supplying cell is distributed to the selected receiving cell (S353).

By comparing the useful soil volume supplied from the supplying cell and the useful soil volume needed for the receiving cell, it is identified whether the useful soil volume supplied from the supplying cell is more or less than the useful soil volume needed for the receiving cell (S354).

When the useful soil volume supplied from the supplying cell exceeds the useful soil volume needed for the receiving cell, the excess of the supplied useful soil volume is calculated (S355). In addition, the receiving cell located at the next shortest distance from the supplying cell is selected (S352) and the excess is distributed (S353).

When the useful soil volume supplied from the supplying cell falls short of the useful soil volume needed for the receiving cell, it is identified whether there is any other cell for supplying the useful soil volume to the receiving cell (S356).

When there is any other cell for supplying the useful soil volume, the next supplying cell located at the shortest distance from the receiving cell is selected (S357) and the useful soil volume of the selected supplying cell is distributed to the receiving cell (S353).

When there is no other cell for supplying the useful soil volume, the spoil bank is taken out of the cutting area (S358).

It should be understood that the embodiments described above are illustrative but not restrictive in all aspects. The scope of the disclosure is defined by the appended claims rather than the detailed description, and all changes or modifications derived from the meaning and scope of claims and their equivalents should be construed as falling within the appended claims.

The invention claimed is:

1. A soil distribution planning system comprising:
a grid-model generation module configured to receive information about three-dimensional (3D) topography, ground and a target model and generate a 3D grid model by dividing a target area;
an earthwork-volume calculation module configured to calculate an earthwork volume of each grid in the 3D grid model generated by the grid-model generation module and store the calculated earthwork volume in a database; and
an earthwork-volume distribution module configured to distribute an earthwork volume of a cutting area to a banking area based on the earthwork volume stored in the database,
wherein the earthwork-volume distribution module comprises a grid selection engine configured to select a grid, which has a highest elevation in a cutting area, as a supplying cell for distributing the earthwork volume from the cutting area to the banking area.

2. The soil distribution planning system of claim 1, wherein the grid-model generation module comprises a cutting/banking area designation engine configured to designate the cutting area and the banking area by comparing a geometry of the received 3D topography and the received target model.

3. The soil distribution planning system of claim 2, wherein the grid-model generation module further comprises a grid-size setting engine configured to set a grid size of the 3D grid model,
wherein a height of a grid in the grid size is set based on a designed elevation that one-stage excavation has in consideration of multi-stage excavation of earthworks.

4. The soil distribution planning system of claim 2, wherein the grid-model generation module further comprises a boundary-line extraction engine configured to extract a boundary line of the cutting area and the banking area.

5. The soil distribution planning system of claim 1, wherein the earthwork-volume calculation module is configured to store a total earthwork volume, earthwork volumes according to rock qualities, a useful soil volume, and a spoil bank volume in the database.

6. The soil distribution planning system of claim 4, wherein, when a dozer is used in a soil distribution plan, the earthwork-volume distribution module comprises a dozer work engine configured to:
generate offset lines at a certain distance from the boundary line to the cutting area and to the banking area;
select grids comprising the offset lines by separating all grid models included between the offset lines and the grid models comprising the offset lines; and
calculate a cutting useful-soil volume for grids included in the cutting area, and a banking volume for each grid included in the banking area.

7. The soil distribution planning system of claim 1, wherein the earthwork-volume distribution module comprises a useful-soil distribution engine configured to distribute a useful soil volume of the supplying cell to the receiving cell of the banking area.

8. The soil distribution planning system of claim 7, wherein the useful-soil distribution engine is configured to select a receiving cell corresponding to a predetermined condition from the supplying cell and distribute the useful soil volume to the supplying cell.

9. The soil distribution planning system of claim 8, wherein the useful-soil distribution engine is configured to:
calculate an excess of the supplied useful soil volume when the useful soil volume supplied from the supplying cell exceeds the useful soil volume needed for the receiving cell; and
select a next receiving cell corresponding to the predetermined condition from the supplying cell and distribute the excess to the selected receiving cell.

10. The soil distribution planning system of claim 8, wherein the useful-soil distribution engine is configured to select a next supplying cell and distribute the useful soil volume of the selected next supplying cell to the receiving cell when the useful soil volume supplied from the supplying cell falls short of the useful soil volume needed for the receiving cell.

11. A soil distribution planning method comprising:
receiving information about three-dimensional (3D) topography, ground and a target model;
a grid-model generation step of generating a 3D grid model by dividing a target area;
an earthwork-volume calculation step of calculating an earthwork volume of each grid in the 3D grid model and storing the calculated earthwork volume in a database; and
an earthwork-volume distribution step of distributing an earthwork volume of a cutting area to a banking area based on the earthwork volume stored in the database,
wherein the earthwork-volume distribution step comprises a grid selection step of selecting a grid, which has a highest elevation in a cutting area, as a supplying cell for distributing the earthwork volume from the cutting area to the banking area.

12. The soil distribution planning method of claim 11, wherein the grid-model generation step comprises:
a cutting/banking area designation step of designating the cutting area and the banking area by comparing a geometry of the received 3D topography and the received target model;
a boundary-line extraction step of extracting boundary lines of the cutting area and the banking area; and
a grid-size setting step of setting a grid size of the 3D grid model.

13. The soil distribution planning method of claim 12, wherein, in the grid-size setting step, a height of a grid is set based on a designed elevation that one-stage excavation has in consideration of multi-stage excavation of earthworks.

14. The soil distribution planning method of claim 11, wherein the earthwork-volume calculation step comprises storing a total earthwork volume, earthwork volumes according to rock qualities, a useful soil volume, and a spoil bank volume in the database.

15. The soil distribution planning method of claim 11, wherein the earthwork-volume distribution step comprises an earthwork-volume distribution step for a dozer, when a dozer is used in a soil distribution plan, comprising:
generating offset lines at a certain distance from the boundary line to the cutting area and to the banking area;
selecting grids comprising the offset lines by separating all grid models included between the offset lines and the grid models comprising the offset lines; and
calculating a cutting useful-soil volume for grids included in the cutting area, and a banking volume for each grid included in the banking area.

16. The soil distribution planning method of claim 11, wherein the earthwork-volume distribution step comprises a useful-soil distribution step of distributing a useful soil volume of the supplying cell to the receiving cell of the banking area, and wherein the useful-soil distribution step comprises selecting a receiving cell corresponding to a predetermined condition from the supplying cell and distributing the useful soil volume to the supplying cell.

17. The soil distribution planning method of claim 16, wherein the useful-soil distribution step comprises:

calculating an excess of the supplied useful soil volume when the useful soil volume supplied from the supplying cell exceeds the useful soil volume needed for the receiving cell; and selecting a next receiving cell corresponding to the predetermined condition from the supplying cell and distributing the excess to the selected receiving cell.

18. The soil distribution planning method of claim 16, wherein the useful-soil distribution step comprises selecting a next supplying cell and distributing the useful soil volume of the selected next supplying cell to the receiving cell when the useful soil volume supplied from the supplying cell falls short of the useful soil volume needed for the receiving cell.

* * * * *